United States Patent [19]

Strang, Sr.

[11] 4,273,618
[45] Jun. 16, 1981

[54] BAFFLE FOR ALCOHOL STILLS

[75] Inventor: Robert E. Strang, Sr., North Liberty, Ind.

[73] Assignee: Injection Plastics & Manufacturing Co., LaPaz, Ind.

[21] Appl. No.: 172,752

[22] Filed: Jul. 28, 1980

[51] Int. Cl.³ ............................................. B01D 3/02
[52] U.S. Cl. .................................. 202/158; 261/114 R; 261/114 TC
[58] Field of Search ............ 261/113, 114 R, 114 TC, 261/114 A, 114 JP, 114 VT; 202/158, 163, 270

[56] References Cited

U.S. PATENT DOCUMENTS

| | | | |
|---|---|---|---|
| 2,080,167 | 5/1937 | Da Valle | 202/158 |
| 2,290,055 | 7/1942 | Kinsey | 261/114 R X |
| 2,672,330 | 3/1954 | Swenson | 202/158 X |
| 2,967,699 | 1/1961 | Brown | 261/114 R |
| 3,367,638 | 2/1968 | Leva | 261/113 |
| 3,814,397 | 6/1974 | Geist et al. | 202/158 X |
| 3,996,317 | 12/1976 | Sarmiento et al. | 261/113 X |
| 3,997,633 | 12/1976 | Leva et al. | 261/113 |
| 4,032,410 | 6/1977 | Kuxdorf et al. | 202/158 |
| 4,062,662 | 12/1977 | Kuxdorf et al. | 261/113 X |
| 4,151,232 | 4/1979 | Slobodyanik | 202/158 X |

FOREIGN PATENT DOCUMENTS 2374065  12/1976  France ............................ 261/114 TC

*Primary Examiner*—Richard L. Chiesa
*Attorney, Agent, or Firm*—Oltsch, Knoblock & Hall

[57] ABSTRACT

A baffle for use in an alcohol still. The baffle is provided with a concentric series of openings spaced and arranged to accommodate substantially even dispersement therethrough of steam at required temperature and pressure. Ribs on the baffle enhance uniformity of flow through openings throughout the baffle.

6 Claims, 8 Drawing Figures

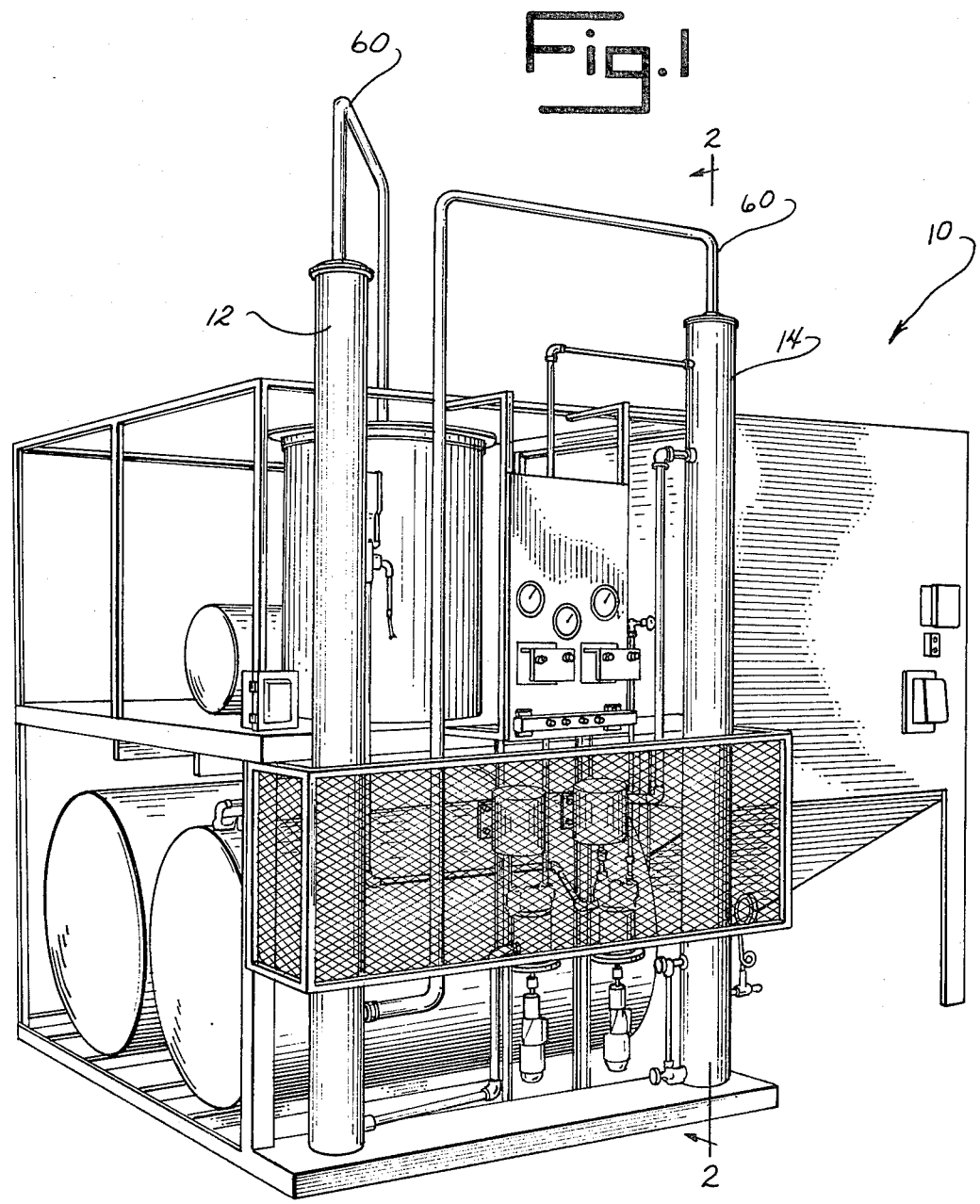

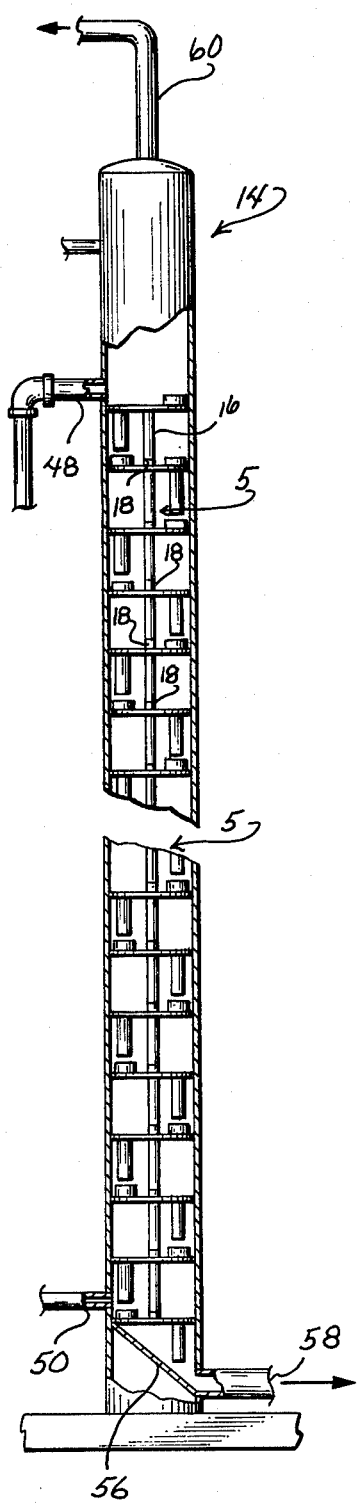
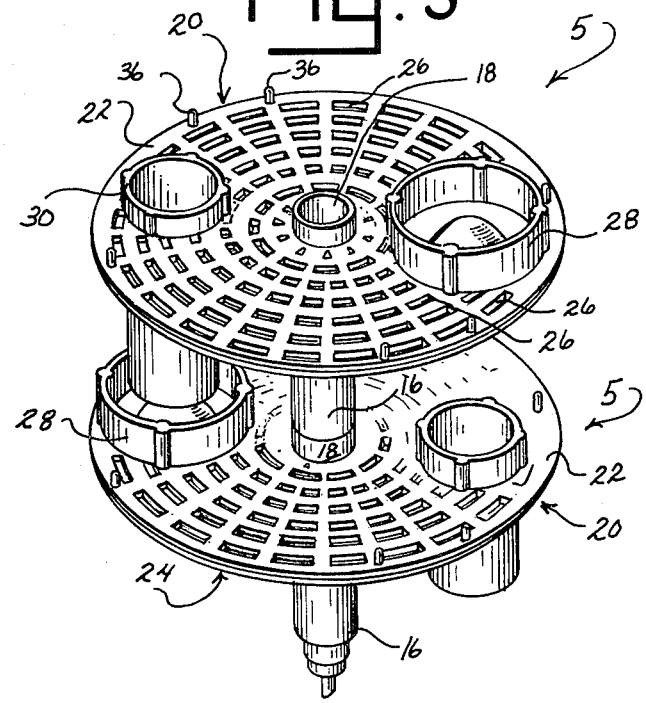
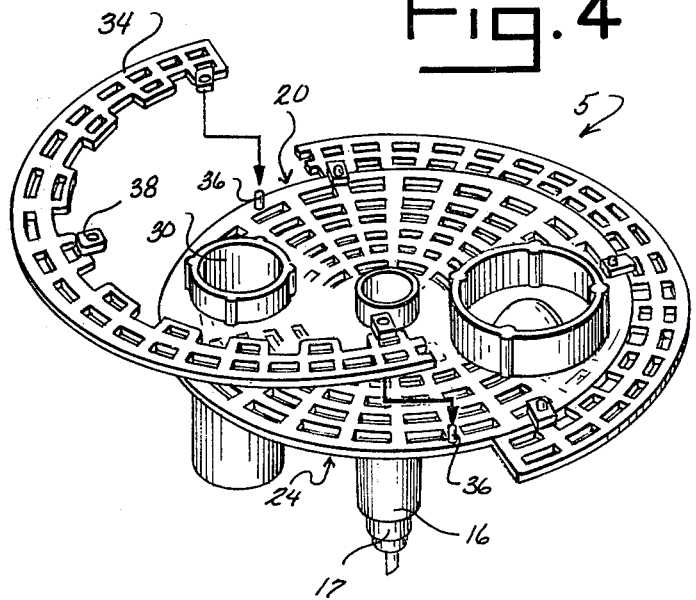

BAFFLE FOR ALCOHOL STILLS

SUMMARY OF THE INVENTION

This invention relates to a baffle used in an alcohol still. This invention especially relates to a baffle to be used in the cooking and stripping columns of an alcohol still.

Prior still baffles have generally been formed of metal and were provided with a plurality of spaced round holes. Such metal baffles have been characterized by the requirement of a number of baffles in each still column greater than the number of baffles necessary with the present invention. Additionally, the metal baffles have been subject to a build-up or adhesion of grain and mash upon them which has tended to progressively clog the baffle openings. The holes of the metal baffles also have a lesser capacity for steam flow therethrough and have less uniformity of steam flow than the design of the present application.

The baffle of the present invention is preferably formed of nylon or other suitable molded material and is provided with a plurality of concentric series of substantially uniformly spaced arcuate openings in each series. There is a graduation or increase of size of the baffle openings from those in the central or inner series to those in the outermost series. This graduation of sizes of openings enhances achievement of substantially uniform flow characteristics of steam to act upon the grain supported on the baffle at any selected level, thereby facilitating continuous agitation and substantially uniform reaction of the steam and grain. With the continuous agitation of the grain, clogging of the baffle openings is minimized. This allows efficient use of steam and, consequently, accommodates cooking of the grain at lesser steam pressures and lower temperatures than required in prior stills. The lower temperature and pressure results in a higher retention of protein in the grain and enhances the value of the cooked grain residue for use as animal feed.

The low pressure and temperature of operation of a still with the novel baffles produces fuel efficient operation of a still. Also, more baffles are utilized in the still columns that are reduced substantially in height and in diameter.

Accordingly, it is an object of this invention to provide a improved baffle for use in an alcohol still.

Another object is to provide a baffle which promotes highly efficient and economical production of alcohol.

Another object is to provide a baffle for an alcohol still which permits a still to operate at lower temperature and pressure than a still with baffles of prior types.

Other objects will become obvious upon a reading of the follow description.

BRIEF DESCRIPTION OF THE DRAWINGS

FIG. 1 is a perspective view of a still.

FIG. 2 is a vertical cross-sectional view of a cooking column of a still taken on line 2—2 of FIG. 1.

FIG. 3 is a perspective view of two connected baffles.

FIG. 4 is a perspective view of a baffle with extension parts by which it may be enlarged.

DESCRIPTION OF THE PREFERRED EMBODIMENTS

Figure 5:
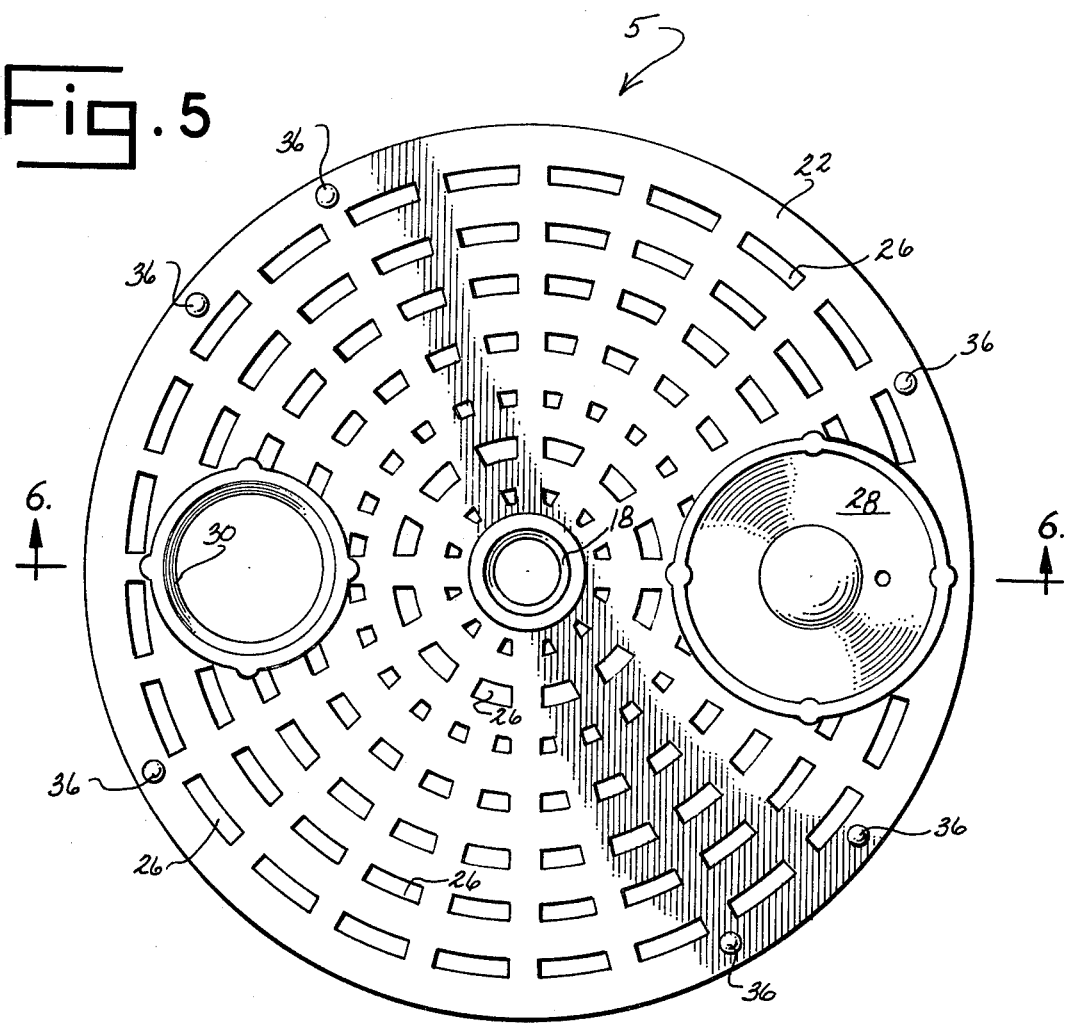
FIG. 5 is a top plan view of the baffle.
Figure 6:
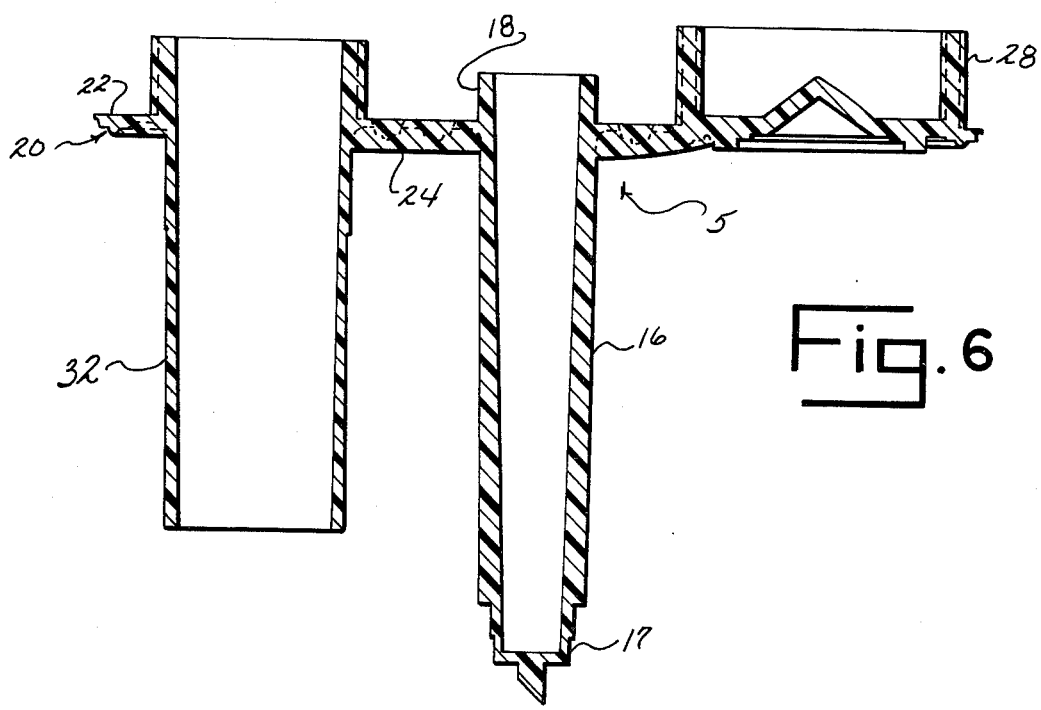
FIG. 6 is a vertical cross-sectional view of the baffle taken on line 6—6 of FIG. 5.
Figure 7:
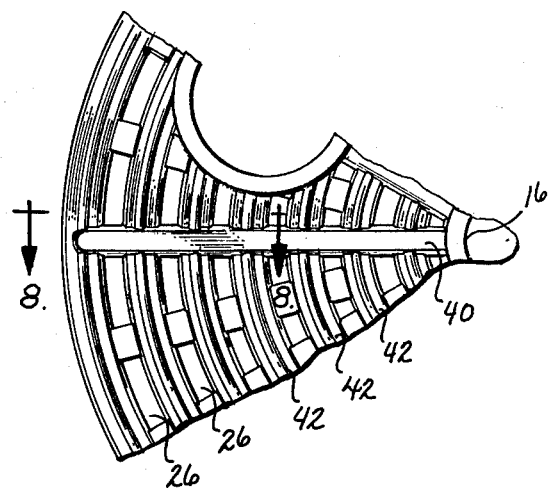
FIG. 7 is a fragmentary bottom plan view of the baffle.
Figure 8:
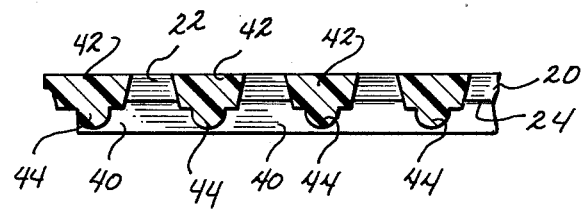
FIG. 8 is a fragmentary cross-sectional view of the baffle taken on line 8—8 of FIG. 7.

The preferred embodiment illustrated is not intended to be exhaustive or to limit the invention to the precise form disclosed. It is chosen and described in order to best explain the principles of the invention and its application and practical use and to thereby enable others skilled in the art to best utilize the invention.

Baffle 5 is preferably molded of nylon, such as Zytel 70-G 33HRL, and is utilized in columns 12, 14 of alcohol still 10. Baffle 5 may be formed of any other molded material found suitable to function at required temperature and pressure and inert under operating conditions existing in an alcohol still. As shown in the drawings, baffles 5 are stacked one atop another within a still column.

Each baffle constitutes a molded substantially flat disc 20 having an internal central axial tubular part 16 with a reduced lower cup part 17. The central tubular part 16 includes an upper open end 18 projecting above the disc 20 and an elongated portion extending below the disc. Body 20 of each baffle has an upper cooking surface 22 and lower refracting surface 24.

A second tubular portion 30, open at its ends, is formed integrally with disc body 20 spaced from tube part 16. The upper end of tube 30 projects above top disc surface 22 and the lower end 32 of tube 30 projects below bottom disc surface 24 a distance slightly less than the spacing of cup portion 17 below disc surface 24. At a point opposite to tube part 30 an annular integral part 28 of larger diameter than the lower end of tube part 32 is formed integrally with disc body 20 and projects upwardly therefrom.

Body 20 is interrupted by a plurality of substantially concentric spaced series of spaced apertures 26. Apertures 26 are preferably substantially arcuate and of graduated sizes in different series so that the proportion of the area of any apertured section of the disc which is open at said apertures is substantially equal to the proportion which is open at apertures in other apertured sections.

A plurality of radial arms or ribs 40 are formed integrally with disc body 30 and project from the bottom refracting surface 24. Also a plurality of integral concentric ribs 42 project from the bottom surface of body 20 between concentric series of apertures 26, which ribs may have rounded edges 44 for steam dispersement.

Each disc 5 preferably has a plurality of integral upwardly projecting spaced pins 36 adjacent its outer edge. Pins 36 provide means for attachment of arcuate apertured adapters 34 to the baffle to accommodate enlargement of the size of the baffle so as to span a column of larger diameter than the diameter of baffle disc 20. Each arcuate adapter 34 has a plurality of integral upwardly offset apertured ears 38 adapted to overlie the margin of a disc adjacent all pins 36 and to fit around said pins to anchor the adapter to the baffle disc 20 in coplanar relation thereto as seen in FIG. 4. Each adapter 34 has one or more circular series of spaced apertures 26 formed therein.

To utilize baffles 5 within a still column 12 or 14, a series of baffles are inter-connected by fitting the lower reduced cup part 17 in the upper end of tube 18 of the next lower disc 5 so the baffles are arranged in concentric uniformly spaced relation. The cup forming part 28 of each baffle is positioned below the downcomer tube 30 of the baffle thereabove. Mash or grain is fed into the upper end of column 14 through inlet 48.

Pressurized steam is introduced into the lower end of column 14 through steam inlet 50. As steam rises in column 14 it strikes the baffles successively. The concentric ribs 42 and radial ribs 40 serve to retain the steam in the area of the bottom refracting surface 24 of each baffle which it strikes, i.e. between the ribs 42 and 40 so as to direct the steam to and through the adjacent baffle apertures 26. The projection of ribs 42 and 40 below the refracting baffle face 24 prevents the steam from flowing laterally along the lower surface of the baffle as occurs characteristically in stills with the prior type of flat metal baffle. Because of this ribbed construction, less steam pressure is needed to cook the grain and the mash which is supported on upper baffle cooking surfaces 22 and is constantly and substantially uniformly agitated by substantially uniform flow of steam therethrough above and adjacent each aperture 26. The diameter of collection cup 28 is greater than that of downcomer tube 30 which preferably projects therein with clearance. Each collection cup 28 blocks steam from flowing up the adjacent downcomer tube 30. The projection of the upper end of downcomer tube 30 and of cup 28 above each baffle serves to normally retain grain on the apertured cooking surface 22 of each baffle.

As grain is fed onto the uppermost baffle 5, steam passes through it and draws alcohol from it. When the grain or mash on the upper baffle reaches a level greater than the height of the upper end of the downcomer tube, the grain or mash flows into and through downcomer tube 30 and into collection cup 28 of the next lower baffle. Upon reaching a level higher than collection cup 28, the grain and mash overflows onto the next lower cooking surface 22. The cycle continues until the lowest level is reached and the mash flows down inclined deflector plate 56 and discharges at mash outlet 58.

The continued flow of steam continues to cook the mash as the mash moves down column 14 from baffle to baffle and the steam flows upwardly by convection. Alcohol with a high volatility rises up the column and discharges at outlet 60 with the steam.

It is understood that the invention is not to be limited to the above description but may be amended within the scope of the appended claims.

What I claim is:

1. A baffle for an alcohol still, said baffle comprising a body having an upper cooking surface and lower refracting surface and a plurality of concentric series of spaced openings therethrough, a collection cup extending upwardly from said cooking surface, an open-ended downcomer tube carried by said body and projecting above said cooking surface and below said refracting surface, spacer means carried by said baffle and including an upwardly projecting socket and a downwardly projecting portion axially aligned with said socket, said downwardly projecting spacer of one baffle interfitting with and supported by the socket of another baffle, said spacer means being substantially centrally located on said body, said collection cup and downcomer tube being arranged in complementary relation for alignment with cooperating complementary parts of adjacent baffles, said refracting surface having a plurality of substantially radial ribs and a plurality of spaced concentric ribs projecting downwardly from said refracting surface.

2. The baffle of claim 1, wherein said openings are arcuate and differ in size in different circumferential series thereof.

3. The baffle of claim 1, wherein said baffle is formed of a molded polyester material inert in the presence of steam and alcohol.

4. The baffle of claim 1 wherein said baffle is formed of nylon.

5. The baffle of claim 1, and apertured extension means releasably anchored to the margin of said body.

6. The baffle of claim 5, wherein a plurality of spaced pins project upwardly from said cooking surface, said extension means having openings fitting around and anchored to said pins.

* * * * *